(12) United States Patent
Tobita et al.

(10) Patent No.: US 8,064,818 B2
(45) Date of Patent: Nov. 22, 2011

(54) DISTRIBUTION METHOD AND DISTRIBUTION MANAGEMENT DEVICE

(75) Inventors: Noriaki Tobita, Tokyo (JP); Kentaro Endo, Tokyo (JP); Toshiki Takatsu, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 682 days.

(21) Appl. No.: 11/847,079

(22) Filed: Aug. 29, 2007

(65) Prior Publication Data
US 2009/0011697 A1   Jan. 8, 2009

(30) Foreign Application Priority Data

Aug. 30, 2006 (JP) .................................. 2006-233923

(51) Int. Cl.
*H04H 20/71* (2008.01)
(52) U.S. Cl. ..................... 455/3.01; 455/3.02; 455/3.06; 455/432.1; 455/436; 455/444
(58) Field of Classification Search .... 455/456.1–456.3, 455/456.5, 3.03–3.06, 432.1, 436–444
See application file for complete search history.

(56) References Cited

U.S. PATENT DOCUMENTS

| | | | | |
|---|---|---|---|---|
| 5,564,068 | A | 10/1996 | Nguyen ..................... | 455/33.1 |
| 6,684,073 | B1 | 1/2004 | Joss et al. ................... | 455/433 |
| 6,738,622 | B1 | 5/2004 | Stadelmann et al. ....... | 455/435.1 |
| 6,826,414 | B1 | 11/2004 | Reynolds et al. ............ | 455/555 |
| 6,871,065 | B2 | 3/2005 | Yamaguchi ................ | 455/414.1 |
| 6,999,762 | B2 | 2/2006 | Uchida ...................... | 455/432.1 |
| 7,219,225 | B2 | 5/2007 | Rhodes ...................... | 713/153 |
| 7,386,311 | B2 | 6/2008 | Soga et al. | |
| 2002/0023010 | A1* | 2/2002 | Rittmaster et al. ........... | 705/26 |
| 2002/0107006 | A1 | 8/2002 | Nitta ........................... | 455/414 |
| 2003/0013458 | A1 | 1/2003 | Yabe et al. .................. | 455/456 |
| 2003/0083067 | A1 | 5/2003 | Hanson ...................... | 455/433 |
| 2003/0100303 | A1* | 5/2003 | Armbruster et al. ......... | 455/433 |
| 2004/0049438 | A1* | 3/2004 | Laumen et al. ................ | 705/32 |
| 2004/0093253 | A1 | 5/2004 | Iijima ........................... | 705/8 |
| 2004/0157600 | A1 | 8/2004 | Stumpert et al. ........... | 455/432.1 |

(Continued)

FOREIGN PATENT DOCUMENTS

CN         1520226 A        8/2004

(Continued)

OTHER PUBLICATIONS

European Office Action issued Dec. 11, 2008 in European application No. 07016535.2, 6 pages.

(Continued)

*Primary Examiner* — Fayyaz Alam
(74) *Attorney, Agent, or Firm* — Brinks Hofer Gilson & Lione

(57) ABSTRACT

The present invention enables provision of a service in which a distribution method of content is changed depending on a location of a mobile station. Specifically, if a user of mobile station MS is located in a country where the usage of content is not permitted, content server CS detains the content temporarily, and after confirming that the user has moved to a country where the usage of the content is permitted, sends the detained content to mobile station MS of the user. When detaining the content, content server CS checks whether an expected date of the user moving to a country where the usage of the content is permitted is within a distribution period of the content, and if so, detains the content.

45 Claims, 8 Drawing Sheets

U.S. PATENT DOCUMENTS

| | | | |
|---|---|---|---|
| 2004/0192195 A1* | 9/2004 | Soga et al. | 455/11.1 |
| 2005/0043012 A1* | 2/2005 | Benco et al. | 455/406 |
| 2005/0102422 A1 | 5/2005 | Yamamote et al. | 709/238 |
| 2005/0119000 A1* | 6/2005 | Nasielski et al. | 455/433 |
| 2005/0249175 A1 | 11/2005 | Nasu et al. | |
| 2006/0111125 A1 | 5/2006 | Karaoguz | |
| 2007/0111721 A1* | 5/2007 | Schmidt et al. | 455/419 |
| 2009/0011758 A1* | 1/2009 | Aoki et al. | 455/432.1 |

FOREIGN PATENT DOCUMENTS

| | | |
|---|---|---|
| CN | 1691546 A | 11/2005 |
| EP | 1 599 020 A2 | 11/2005 |
| EP | 1667476 A1 | 6/2006 |
| JP | 5-236074 A | 9/1993 |
| JP | 2000-11538 A | 1/2000 |
| JP | 2001-285916 | 10/2001 |
| JP | 2001-291021 | 10/2001 |
| JP | 2004-236182 A | 8/2004 |
| JP | 2005-301891 A | 10/2005 |
| WO | WO 99/055102 | 10/1999 |
| WO | WO 02/089442 A1 | 11/2002 |
| WO | WO 02/091262 A1 | 11/2002 |
| WO | WO 2005/029886 A1 | 3/2005 |
| WO | WO 2005 /096596 A1 | 10/2005 |
| WO | WO 2005/117479 A1 | 12/2005 |

OTHER PUBLICATIONS

EPO Search Report issued Feb. 28, 2008 in European patent application No. 07016535.2.

ETSI Digital cellular telecommunications system (Phase 2+) (GSM) Universal Mobile Telecommunications System (UMTS) General Packet Radio Service (GPRS) Service description; Stage 2 (3GPP TS 23.060 version 5.1.0 Release 5); ETSI TS 123 060, v. 5.1.0, Mar. 2002, pp. 1, 118-124, 157-161, 185-192 XP-002282236.

European Search Report dated Jun. 14, 2004 issued in European Patent Application No. 04001781.6, (3 pgs. In English).

Chinese Office Action dated Nov. 18, 2005 issued in Chinese Patent Application No. 200410005310.9 (10 pgs., with translation).

Japanese Office Action dated Nov. 28, 2006 issued in Japanese Patent Application No. JP-2003-024664 (4 pgs., with translation).

U.S. Office Action dated Jan. 4, 2007 issued in U.S. Appl. No. 10/761,663 (15 pgs.).

U.S. Office Action dated Aug. 24, 2007 issued in U.S. Appl. No. 10/761,663 (35 pgs.).

Office Action from counterpart Chinese Application No. 2007101478449, dated Dec. 25, 2009, 16 page (with translation).

* cited by examiner

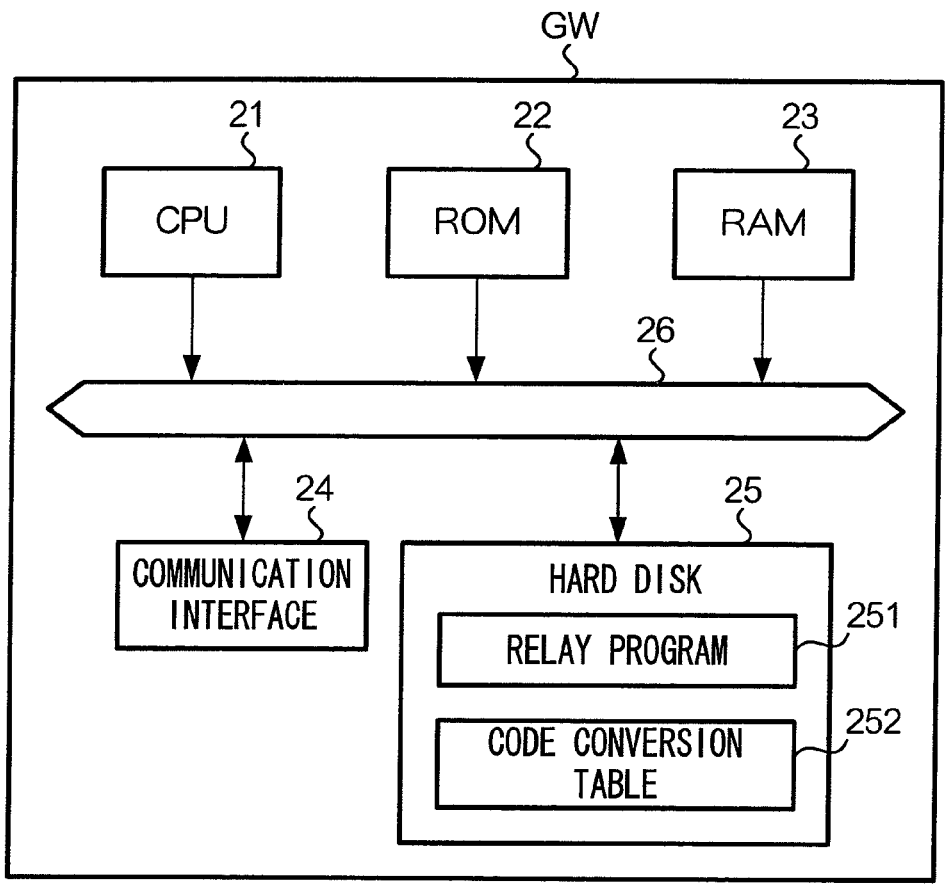

FIG. 7

| FILENAME | MUSIC NAME | OVERSEAS DISTRIBUTION ALLOWABILITY | DISTRIBUTION PERIOD |
|---|---|---|---|
| music1.wav | TOMORROW IS ANOTHER DAY | NOT ALLOWED | 2006/4/1~2006/4/8 |
| music2.wav | STARRY SKY | NOT ALLOWED | 2006/4/1~2006/4/8 |
| music3.wav | LET'S GO TO THE BEACH | NOT ALLOWED | 2006/4/1~2006/4/8 |
| music4.wav | SUMMER VACATION | NOT ALLOWED | 2006/4/1~2006/4/8 |
| music5.wav | TINY RIPPLES | ALLOWED | 2006/4/8~2006/4/30 |
| music6.wav | TOKYO | ALLOWED | 2006/4/8~2006/4/30 |
| music7.wav | CHANCE | ALLOWED | 2006/4/8~2006/4/30 |
| ... | ... | ... | ... |
| ... | ... | ... | ... |

FIG. 8

| MS IDENTIFIER | DETAINMENT FLAG | RETURN DATE | FILENAME OF DETAINED CONTENT |
|---|---|---|---|
| UID0001 | 1 (CONTENT EXISTS) | 2006/4/13 | music1.wav, music2.wav |
| UID0002 | 0 (NO CONTENT EXISTS) | – | – |
| UID0003 | 0 | – | – |
| UID0004 | 1 | 2006/4/5 | music3.wav, music4.wav |
| ... | ... | ... | ... |
| ... | ... | ... | ... |

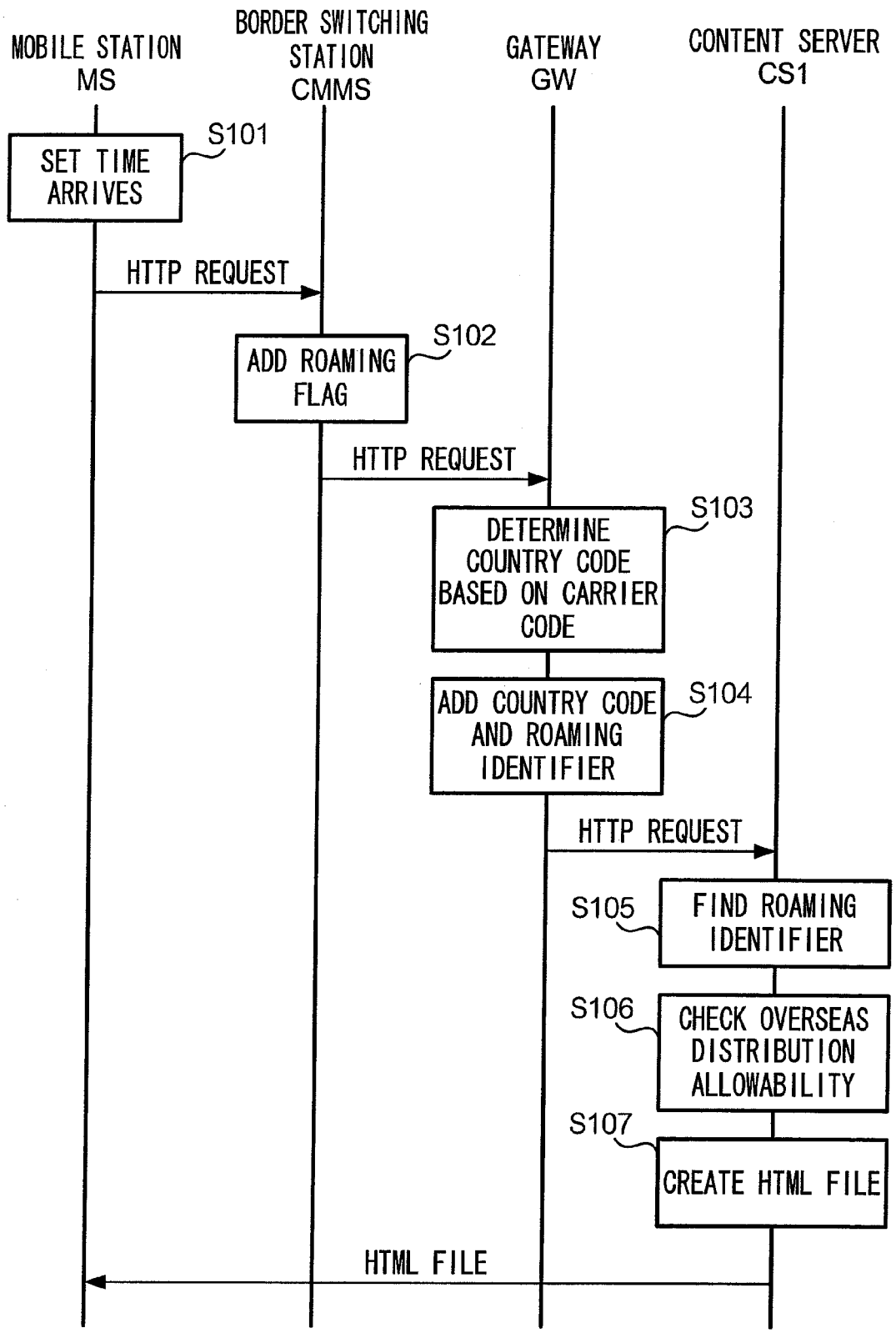

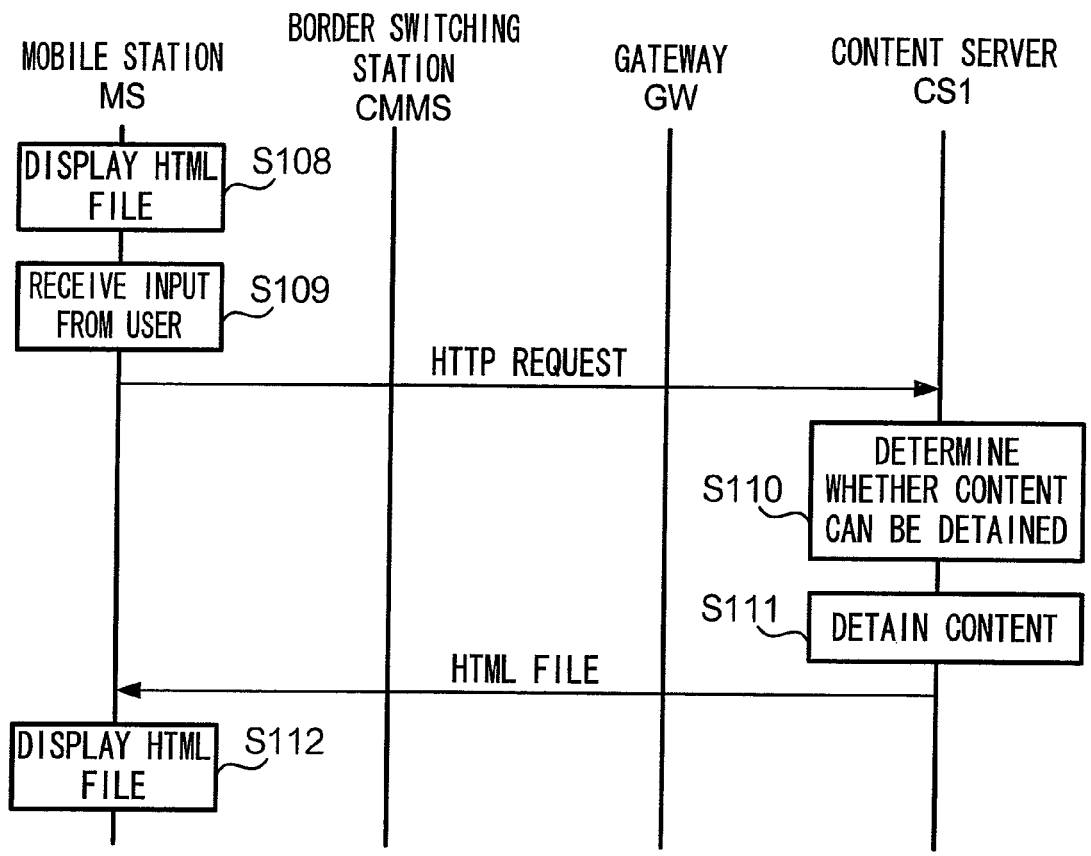

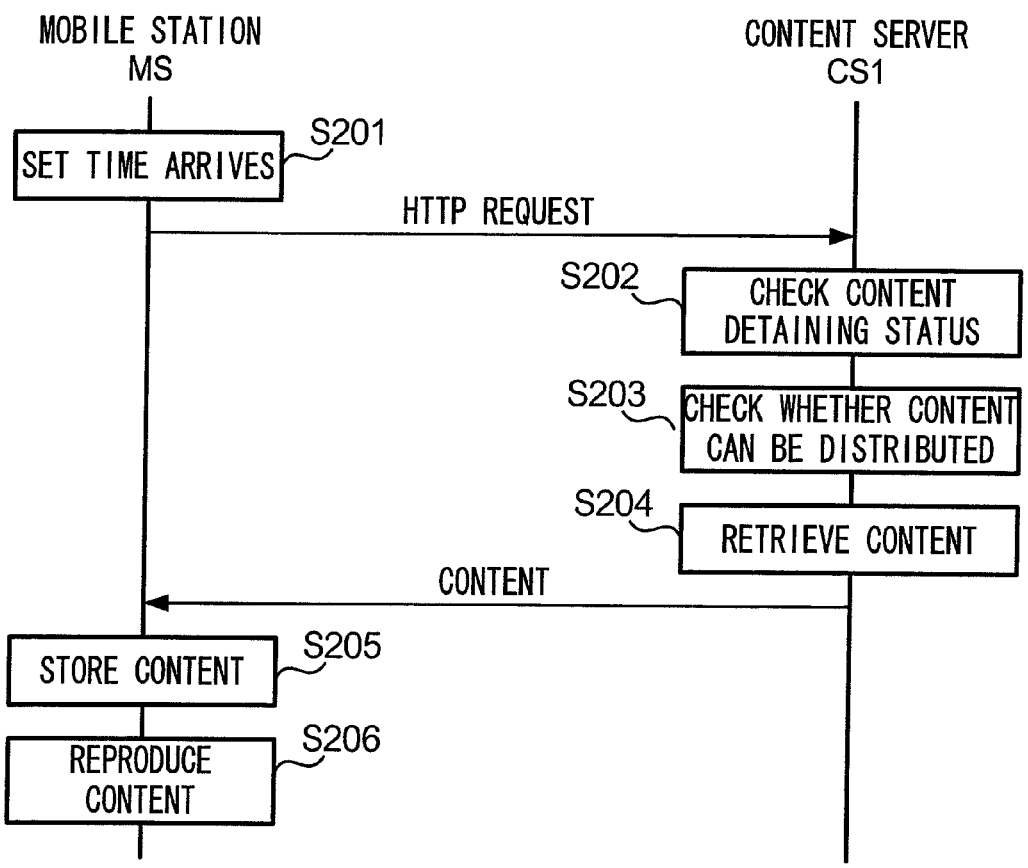

ID
DISTRIBUTION METHOD AND DISTRIBUTION MANAGEMENT DEVICE

This application claims priority under 35 U.S.C. §119 to Japanese Patent Application No. JP2006-233923 filed Aug. 30, 2006, the entire content of which is hereby incorporated by reference.

BACKGROUND

The present invention relates to a technique for distributing content to a mobile station using a roaming service.

In the last several years, so-called roaming services have been provided for fixed-line phones and, more recently, for mobile phones also. A roaming service provides to a user communication services of a carrier to which the user subscribes, via network facilities of another carrier, the carriers having a business agreement to tie up their services. Especially, a cross-border roaming service (hereinafter, "international roaming service") provides an advantage in that a user of a mobile phone, who is located in a foreign country, can receive communication services provided by a carrier in his/her country, via network facilities of a carrier of the foreign country. Methods of appropriately providing communication services to a user via an international roaming service have been proposed in Japanese unexamined patent publication No. H05-236074 and Japanese unexamined patent publication No. 2004-236182

In parallel with improvement of international roaming services, mobile phones are increasingly being used mainly for non-voice communication rather than voice communication. In fact, mobile stations that enable access to a WWW (World Wide Web) server via the Internet for downloading of content and for reproduction/output of the content, are commonly used, and content providers provide various content distribution services.

Contents provided by a content provider include music, electronic books, cartoon images etc., and most contents are protected by copyright. Therefore, a content provider must sign a license agreement with a copyright holder and pay a usage fee, to be allowed to provide a content distribution service.

As coverage by international roaming services increases, it is likely that a user of a content distribution service will be able to receive the service anywhere in the world. While this will be convenient for users, it has a potential to cause copyright problems. For example, certain content may be permitted to be distributed under a contract in Japan, but not in other countries. However, by using an international roaming service, a user of a mobile phone located in a foreign country will be able to receive the content.

A further problem of international roaming services is that communication fees are high. For this reason, some users prefer not to receive a content distribution service in a foreign country. However, if a user uses a push-type information service, in which content is automatically provided to a user without his/her request, or a pseudo-push-type information service, in which a mobile phone automatically requests and obtains content without a user's command, the user may unintentionally receive content.

The present invention has been made in view of the foregoing circumstances, and enables provision of a service in which a distribution method of content is changed depending on a location of a mobile station.

SUMMARY OF THE INVENTION

To address the problems described above, a first aspect of the present invention provides A method of distributing content to a mobile station, the method comprising: receiving a request for the content from the mobile station; determining a current location of the mobile station; determining whether a distribution agreement authorizes distribution of the content to the current location of the mobile station; and transmitting the content to the mobile station if it is determined that the distribution agreement authorizes distribution of the content to the mobile station.

BRIEF DESCRIPTION OF THE DRAWINGS

An exemplary embodiment of the present invention will be described in detail with reference to the following figures, wherein:

FIG. 3 is a block diagram illustrating a configuration of a gateway provided in the communication system;

FIG. 4 is a diagram illustrating a code conversion table provided in the communication system;

FIG. 7 is a diagram illustrating a distribution table provided in the communication system;

FIG. 8 is a diagram illustrating a detained content management table provided in the communication system;

FIG. 9 is a sequence chart of an operation of the communication system;

FIG. 10 is a sequence chart of an operation of the communication system;

FIG. 11 is a diagram illustrating a screen displayed on a mobile station provided in the communication system;

FIG. 12 is a diagram illustrating a screen displayed on a mobile station provided in the communication system; and FIG. 13 is a sequence chart of an operation of the communication system.

DETAILED DESCRIPTION OF THE PREFERRED EMBODIMENTS

Figure 1:
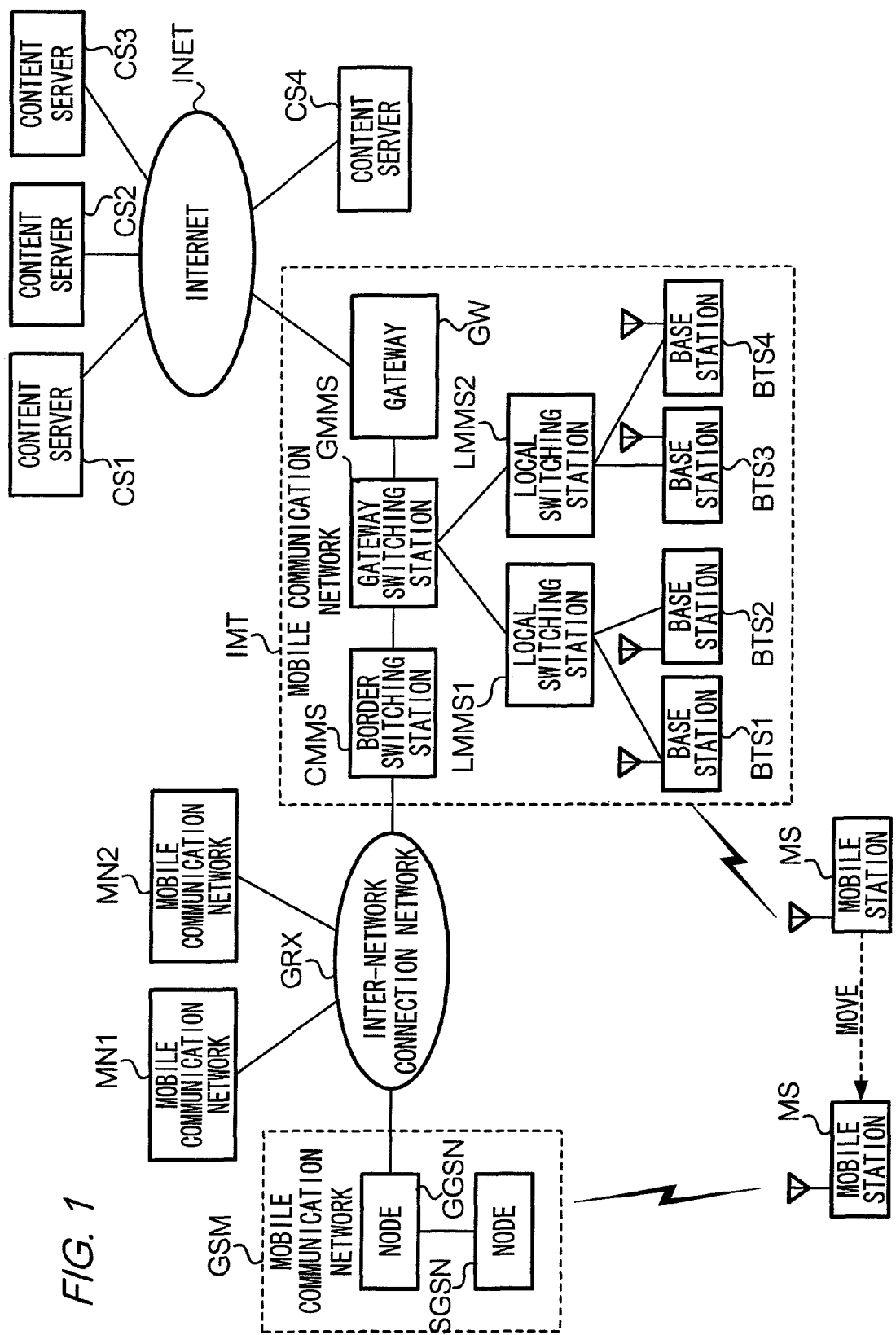
FIG. 1 is a block diagram illustrating a configuration of a communication system according to the exemplary embodiment.

An exemplary embodiment of the present invention will be described with reference to the drawings. In the drawings, like elements are denoted by like numerals.

[A. Configuration]
[Configuration of Entire System]

FIG. 1 is a block diagram illustrating a configuration of a communication system according to the present embodiment.

In the drawing, mobile communication network IMT is a network facility conforming to the standard of International Mobile Telecommunication-2000. Mobile communication network IMT is managed by carrier A of a country (e.g. Japan), and provides services such as voice or data communication to mobile stations MS of users subscribing to the communication services of carrier A. Mobile communication network GSM is a network facility conforming to the standard of the Global System for Mobile Communication. Mobile communication network GSM is managed by carrier B of another country (e.g. the United States), and provides services such as voice or data communication to mobile stations (not shown) of users subscribing to the communication services of carrier B. Mobile communication network IMT, mobile communication network GSM, and mobile communication networks MN1 and MN2, which are managed by carriers of other countries, are inter-connected via inter-network connection network GRX, which connects networks across national borders. The carriers of mobile communication networks IMT, GSM, MN1, and MN2 form a business tie-up with each other to enable international roaming services, and provide mobile stations of their subscribers with international roaming service capability. Therefore, for example, if mobile station MS moves from a service area in mobile communication network IMT to a service area in mobile communication network GSM as shown by the dotted arrow in FIG. 1, mobile station MS can receive communication services via mobile communication network GSM, inter-network connection network GRX, and mobile communication network IMT.

Mobile communication network IMT is provided with: plural base stations BTS1 to BTS4; plural local switch stations LMMS1 and LMMS2; border switching station CMMS; gateway switching station GMMS; and gateway GW. Since base stations BTS1 to BTS4 share their configuration and operation in common, in the following description, they are collectively referred to as "base station BTS" except where it is necessary to specify otherwise. For the same reason, local switching stations LMMS1 and LMMS2 are collectively referred to as "local switching station LMMS".

Base stations BTS are placed within a service area of carrier A, spaced apart at certain intervals, and wirelessly communicate with mobile stations MS located within their coverage area.

Local switching stations LMMS, border switching station CMMS, and gateway switching station GMMS are facilities with capabilities of circuit switching and packet switching in mobile communication network IMT. Local switching station LMMS is connected to plural base stations BTS, and gateway switching station GMMS is connected to local switching stations LMMS, border switching station CMMS, and gateway GW. Border switching station CMMS is connected to inter-network connection network GRX and gateway switching station GMMS.

Among the switching stations, local switching station LMMS and gateway switching station GMMS are commonly known; however, border switching station CMMS has, in addition to the circuit-switching capability and the packet-switching capability, a roaming flag adding function (described later).

Gateway GW is connected to gateway switching station GMMS and to Internet INET. Gateway GW has not only a common gateway function such as protocol conversion and data relay between mobile communication network IMT and Internet INET, but also a code conversion function and a roaming identifier adding function (described later).

Mobile communication network GSM is provided with: node GGSN corresponding to border switching station CMMS; node SGSN corresponding to local switching station LMMS; and a node (not shown) corresponding to base station BTS.

Content servers CS1 to CS4 are connected to Internet INET and operated by entities of the same country as carrier A (in this embodiment, Japan). Since content servers CS1 to CS4 share a common configuration and operation, in the following description, they are collectively referred to as "content server CS" except where it is necessary to specify otherwise.

Content server CS has a WWW (World Wide Web) server function, and stores in a nonvolatile memory such as a hard disk, file-type data of a variety of contents (hereinafter, referred to as "content(s)") and file-type data described in HTML (Hypertext Markup Language) format.

Content server CS, when receiving an HTTP request containing a URL (Uniform Resource Locator), sends to the sender of the HTTP request, an HTTP response containing content or an HTML file identified by the URL.

The term "content" typically means music in the present embodiment; however, it may include data of at least one of text, music, and image, such as an electronic book or a video clip. Also, the term "content" may include a computer program such as game software or a Java (registered trademark) applet. Among the contents, there are contents protected by copyright (protected content) and contents not protected by copyright (unprotected content).

Mobile station MS stores: a mobile station identifier assigned to itself; a set time (e.g. 24:00 everyday); and a URL of content server CS. The mobile station identifier is, for example, a telephone number. The set time and the URL are notified from content server CS to mobile station MS and stored therein before a content distribution service is provided from content server CS to mobile station MS. Mobile station MS, at the set time, sends an HTTP request containing the URL to content server CS, requesting content. Content server CS updates contents hourly or daily, and in response to the HTTP request from mobile station MS, sends the most up-to-date content to mobile station MS as an HTTP response.

Specifically, if content server CS receives a request for content from mobile station MS located in Japan (home network), it sends the content in response to the request. On the other hand, if content server CS receives a request for content from mobile station MS located in a country other than Japan (foreign network), and if the requested content is copyrighted, content server CS detains the content until receiving another request for the content from mobile station MS via the home network. The term "detaining" specifically means temporarily storing content in association with a mobile station identifier to send to mobile station MS later.

Now, a mechanism for enabling content server CS to determine whether access by mobile station MS is from within a home network or from within a foreign network will be described with reference to FIG. 2.

To provide an international roaming service, communication fees need to be agreed upon between a carrier of a mobile communication network in which a user of a mobile phone is actually located (hereinafter, "foreign network") and a carrier of a mobile communication network to which a user of a mobile phone subscribes (hereinafter, "home network"). Furthermore, the communication fees need to be collected by the carriers. Therefore, when an international roaming service is being used, a home network is notified of a carrier code of a carrier managing a foreign network.

Figure 2:
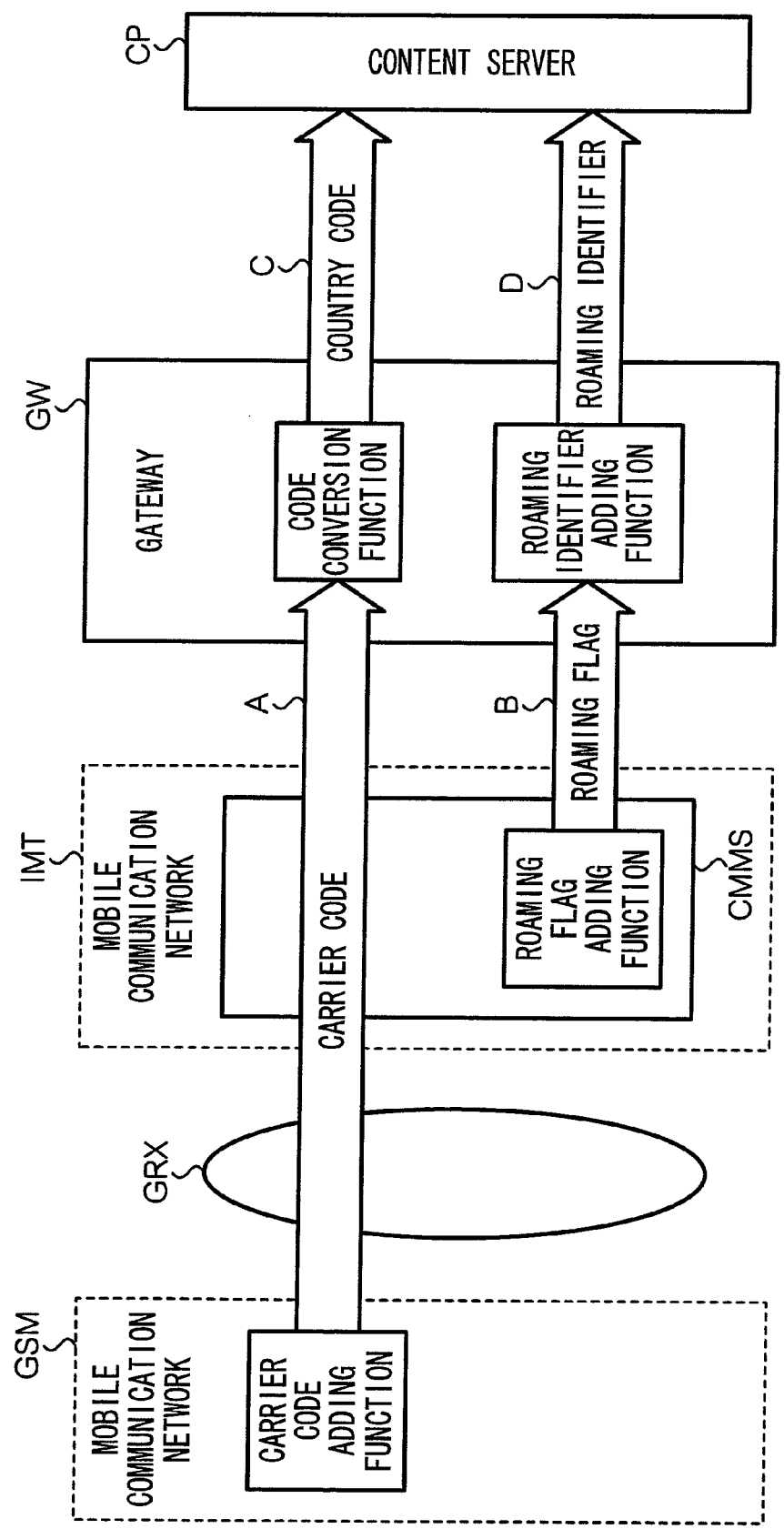
FIG. 2 is a diagram illustrating a mechanism for enabling content server CS to determine whether access by mobile station MS is from within a home network or from within a foreign network.

For example, if a foreign network is mobile communication network GSM and a home network is mobile communication network IMT, a carrier code is added by mobile communication network GSM to a data signal sent from mobile station MS, and thereby notified to mobile communication network IMT as shown by arrow A of FIG. 2. The carrier code is passed to gateway GW via border switching station CMMS.

The function of adding a carrier code to a data signal sent from mobile station MS (hereinafter, "carrier code adding function") may be carried out by any node such as node GGSN or a dedicated device, and the node may be selected by carrier B.

Border switching station CMMS has a roaming flag adding function as described above, and adds a roaming flag to a data signal received via inter-network connection network GRX.

Accordingly, to a data signal passing through border switching station CMMS, a roaming flag and a carrier code are added as shown by arrows A and B of FIG. 2. A field of a data signal in which a roaming flag is added by border switching station CMMS may be determined by carrier A.

Gateway GW has a roaming identifier adding function as described above. Namely, if gateway GW receives a data signal containing a roaming flag, it converts the roaming flag into a roaming identifier which can be read by content server CS, adds the roaming identifier in an HTTP header, and sends the data signal on Internet INET. Gateway GW also has a code conversion function as described above. Namely, if gateway GW receives a data signal containing a carrier code, it converts the carrier code into a country code which can be read by content server CS, adds the country code to an HTTP header, and sends the data signal on Internet INET.

The reason a carrier code is converted into a country code is that a carrier code is defined independently in each of mobile communication networks GSM, MN1, and MN2; therefore, content server CS may not be able to read a carrier code received from the networks.

Fields of an HTTP header in which a roaming identifier and a country code are added by gateway GW may be pre-arranged between carrier A and an operator of content server CS.

The HTTP request to which a country code and a roaming identifier are added by the roaming identifier adding function and the code conversion function is sent from gateway GW to content server CS as shown in arrows C and D of FIG. 2. If the HTTP request contains a roaming identifier, content server CS determines that the HTTP request has been sent from mobile station MS located in a foreign network, and if the HTTP request does not contain a roaming identifier, determines that the HTTP request has been sent from mobile station MS located in a home network. Content server CS also determines, with reference to a country code contained in the HTTP, in which country mobile station MS, which has sent the HTTP request, is located.

FIG. 3 is a block diagram illustrating a configuration of gateway GW.

As shown in the drawing, gateway GW is provided with: CPU (Central Processing Unit) 21; ROM (Read Only Memory) 22; RAM (Random Access Memory) 23; communication interface 24; hard disk 25; and bus 26 interconnecting the components.

ROM 22 stores basic control programs such as an IPL (Initial Program Loader).

CPU 21 executes a program stored in ROM 22 or hard disk 25 to provide a variety of functions described later.

RAM 23 is used as a work area for CPU 21. For example, a program executed by CPU 21 is developed, or data is temporarily stored when a program is run.

Communication interface 24 exchanges data signals.

Hard disk 25 stores relay program 251 and code conversion table 252. Relay program 251 describes a procedure of protocol conversion, data signal relay, code conversion, and roaming identifier adding. Code conversion table 252 is referred to for code conversion. FIG. 4 is a diagram illustrating code conversion table 252. Code conversion table 252 of the drawing shows, for example, that a carrier identified by a carrier code "100010XX1PL" (in this embodiment, assumed to be carrier B) is a carrier of a country identified by a country code "C1001" (in this embodiment, assumed to be the United States).

Now, a procedure executed by CPU 21 of gateway GW will be described with reference to a flowchart shown in FIG. 5.

CPU 21 of gateway GW determines whether a roaming flag is contained in a received data signal (step S11). If a roaming flag is not contained (step S11; No), CPU 21 relays the data signal after converting protocols (step S12). On the other hand, if a roaming flag is contained (step S11; Yes), CPU 21 determines a country code corresponding to a carrier code contained in the data signal with reference to code conversion table 252 (step S13). Subsequently, CPU 21 adds the country code and a roaming identifier in an HTTP header of the data signal (step S14), and sends it via Internet INET as an HTTP request after converting protocols (step S15).

[Configuration of Content Server CS]

Figure 6:
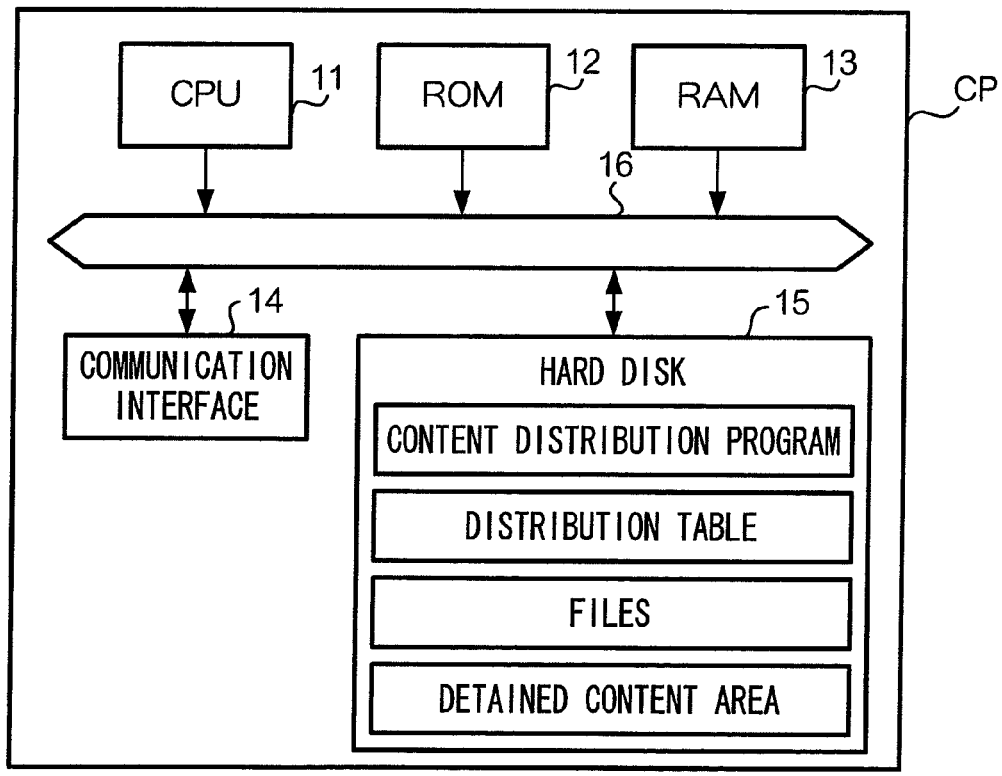
FIG. 6 is a block diagram illustrating a configuration of a content server provided in the communication system.

FIG. 6 is a block diagram illustrating a configuration of content server CS.

As shown in the drawing, content server CS is provided with: CPU 11; ROM 12; RAM 13; communication interface 14; hard disk 15; and bus 16 for interconnecting the components.

ROM 12 stores basic control programs such as an IPL.

CPU 11 executes a program stored in ROM 12 or hard disk 15 to provide a variety of functions described later.

RAM 13 is used as a work area for CPU 11. For example, a program executed by CPU 11 is developed, or data is temporarily stored when a program is run.

Communication interface 14 performs packet communication with communication devices via Internet INET.

Hard disk 25 stores: a content distribution program for distributing content; a distribution table, on the basis of which it is determined whether content is allowed to be distributed; and a variety of files such as a content file and an HTML file. Hard disk 25 also has a detained content area for detaining contents. In the detained content area, a detained content management table for managing a content detaining status for each mobile station MS is also stored.

FIG. 7 shows contents of the distribution table.

In the distribution table, a filename and a music name (content name) of content are associated with overseas distribution allowability and a distribution period.

Overseas distribution allowability is information indicating whether content is allowed to be distributed abroad (to a foreign network). Overseas distribution allowability parameters are determined on the basis of a copyright agreement. Specifically, if content is protected by copyright and permitted under a license agreement to be distributed in Japan only, the content is not allowed to be distributed abroad. On the other hand, if content is not protected by copyright, the content is allowed to be distributed abroad.

A distribution period is a time period during which content is allowed to be distributed in Japan (home network). A distribution period is determined on the basis of a copyright agreement.

For example, in the distribution table of FIG. 7, content with a filename "music1.wav" and a music name "Tomorrow is another day" is associated with overseas distribution allowability parameter "Not Allowed"; therefore, the content is not allowed to be distributed abroad. The content is also associated with distribution period "Apr. 1, 2006 to Apr. 15, 2006"; therefore, the content is allowed to be distributed to mobile station MS located in Japan, but from Apr. 1, 2006 to Apr. 15, 2006 only.

CPU 11 of content server CS executing the content distribution program determines whether to distribute content by referring to the distribution table. Specifically, if there is access to content from mobile station MS located in a foreign country, and it is determined that the content is allowed to be distributed abroad, CPU 11 sends the content to mobile station MS. On the other hand, if the content is not allowed to be distributed abroad, CPU 11 sends an HTML file to mobile station MS to inquire as to whether the content should be detained. If the content is detained, and there is another access to the content from mobile station MS when it is located in Japan, CPU 11 sends the detained content to mobile station MS.

Now, FIG. 8 is a diagram illustrating the detained content management table.

In the detained content management table, a mobile station identifier of mobile station MS is associated with a detainment flag, a return date, and a detained content filename. A detainment flag is a mark indicating whether any content is being detained for associated mobile station MS. A return date is a date on which a user of mobile station MS is expected to return from abroad to Japan. A detained content filename is a filename of a detained content.

For example, according to the detained content management table of FIG. 8, contents with filenames "music1.wav" and "music2.wav" are detained for mobile station MS with a mobile station identifier "UID0001", and a user of mobile station MS is expected to return to Japan on Apr. 13, 2006.

It should be noted that the return date of the present embodiment may be a return time or a return date and time.

[B. Operation]

An operation of the communication system discussed above will be described below with reference to FIGS. 9 to 13.

FIG. 9 is a sequence chart of an operation of the communication system when mobile station MS located in mobile communication network GSM accesses content stored in content server CS1.

As shown in the drawing, mobile station MS sends an HTTP request containing a pre-stored URL at a pre-stored set time (step S10). The HTTP request also contains a mobile station identifier of mobile station MS. To the HTTP request, a carrier code "100010XX1PL" is added by a carrier code adding function of mobile communication network GSM, and the HTTP request is sent to border switching station CMMS via inter-network connection network GRX.

Border switching station CMMS receiving the HTTP request adds a roaming flag to the HTTP request, since the HTTP request contains a carrier code (step S102), and transfers it to gateway GW.

Figure 5:
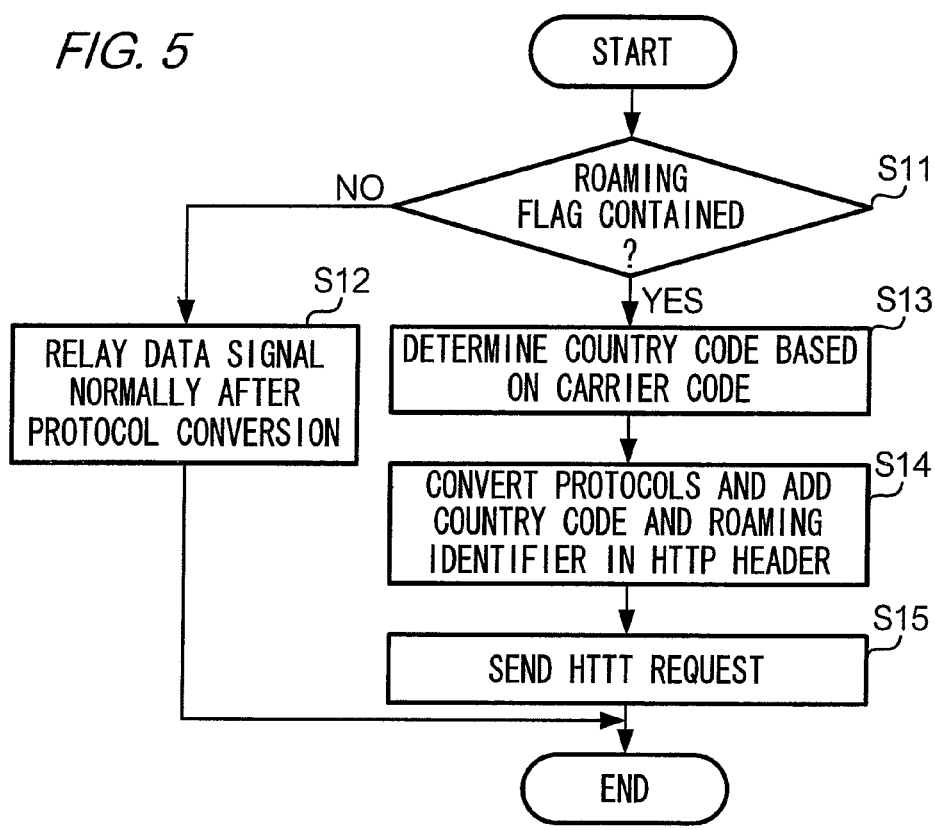
FIG. 5 is a flowchart illustrating a procedure executed by a CPU of the gateway.

Gateway GW receiving the HTTP request carries out an operation shown in FIG. 5. Specifically, since the HTTP contains a roaming flag and a carrier code, gateway GW determines a country code "C1001" corresponding to the carrier code "100010XX1PL" with reference to code conversion table 252 shown in FIG. 4 (step S103). Consequently, gateway GW adds the country code "C1001" and a roaming identifier to an HTTP header of the HTTP request (step S104), and sends it via Internet INET after converting protocols.

When the HTTP request is received by communication interface 14 via Internet INET, CPU 11 of content server CS1 detects the roaming identifier in a header of the HTTP request (step S105). The fact that a roaming identifier is detected means that the HTTP request has been sent from mobile station MS located in a foreign network. Subsequently, CPU 11 finds URLs in the HTTP request, and determines whether contents identified by the URLs (in this embodiment, assumed to be contents with filenames "music1.wav", "music2.wav", and "music3.wav") are allowed to be distributed abroad with reference to the distribution table (step S106). However, the contents are not allowed to be distributed abroad, as shown in FIG. 7. Therefore, since the contents are not allowed to be sent to mobile station MS, CPU 11 of content server CS1 creates an HTML file to inquire of mobile station MS whether the contents should be detained, and sends it to mobile station MS via communication interface 14 (step S107).

On the other hand, if the contents are allowed to be distributed abroad, CPU 11 of content server CS1 retrieves the contents with filenames "music1.wav", "music2.wav", and "music3.wav" from hard disk 15, and sends them to mobile station MS as an HTTP response via communication interface 14.

Mobile station MS receiving the HTML file via gateway GW and border switching station CMMS displays the HTML file in a display, as shown in FIG. 10 (step S108). FIG. 11 shows a screen displayed in the display of mobile station MS. As shown in the drawing, in the screen, the names of the contents subject to detaining are listed, and a text box is provided in which a user can enter his/her expected return date. If a user selects contents titled "Tomorrow is another day" and "Let's go to the beach", enters an expected return date "Apr. 13, 2006" in the text box, and clicks the send button, mobile station MS sends an HTTP request containing the selected/entered data (step S109). The HTTP request is sent via border switching station CMMS and gateway GW, and is received by content server CS1. As border switching station CMMS and gateway GW handle the HTTP request in the same way as explained above with reference to FIG. 9, a description of the process will be omitted here for convenience of explanation.

When the HTTP request is received by communication interface 14, CPU 11 of content server CS1 determines whether the selected contents are detainable (step S110). Specifically, CPU 11 compares the expected return date contained in the HTTP request with a distribution period associated with a selected content in the distribution table. If the expected return date is within the distribution period, CPU 11 determines that the content is detainable. On the other hand, if the expected return date is not within the distribution period, CPU 11 determines that the content is not detainable. According to the distribution table of FIG. 7, distribution periods of the selected contents titled "Tomorrow is another day" and "Let's go to the beach" cover the expected return date "Apr. 13, 2006"; accordingly, CPU 11 determines that the contents are detainable.

Subsequently, CPU 11 sets a detainment flag of "1" in a detained content management table in association with the mobile station identifier contained in the HTTP request, and stores therein the expected return date "Apr. 13, 2006" and the filenames of the detained contents "music1.wav" and "music3.wav". CPU 11 sends an HTML file to mobile station MS via communication interface 14, reporting that the selected contents have been detained. Mobile station MS receiving the HTML file displays it in the display (step S112). FIG. 12 shows a screen displayed in the display of mobile station MS. As shown in the drawing, the screen shows a list of the music names of the detained contents, and a user can check the detained contents with reference to the list.

Now, an operation of the communication system after the user of mobile station MS returns to Japan will be described with reference to FIG. 13. In the following description, it is assumed that the user has returned to Japan on the expected return date "Apr. 13, 2006".

Mobile station MS sends an HTTP request containing the pre-stored URL at the pre-stored set time (step S201). The HTTP request is sent via mobile communication network IMT, and is received by content server CS1. When the HTTP request is received by communication interface 14, CPU 11 of content server CS1 tries to find a roaming identifier in a header of the HTTP request. However, CPU 11 is not able to find a roaming identifier since none has been added to the HTTP request. Therefore, CPU 11 determines that the HTTP request has been sent from mobile station MS located in the home network. In this case, CPU 11 finds the mobile station identifier "UID0001" in the HTTP request, and checks a content detaining status corresponding to the mobile station identifier with reference to the detained content management table (step S202). Assuming that a detainment flag corresponding to the mobile station identifier "UID0001" is "1" as shown in FIG. 8, it means that some contents have been detained for mobile station MS.

On the other hand, if the detainment flag is "0", it means that no content has been detained for mobile station MS. In this case, CPU 11 sends the most recent versions of the contents stored in hard disk 15 to mobile station MS as an HTTP response via communication interface 14.

Subsequently, CPU 11 compares the receiving date on which the HTTP request was received and distribution periods associated with the detailed contents to check whether the receiving data is within the distribution periods (step S203). The receiving date may be identified using a clock program that is stored in hard disk 15 and executed by CPU 11. According to the distribution table of FIG. 7, the distribution periods of the content titled "Tomorrow is another day" and the content titled "Let's go to the beach" are both "Apr. 1, 2006 to Apr. 15, 2006"; namely, they cover the received data "Apr. 13, 2006". Accordingly, CPU 11 determines that the contents are allowed to be distributed. Subsequently, CPU 11 retrieves the contents with filenames "music1.wav" and "music3.wav" from hard disk 15, and sends them to mobile station MS as an HTTP response via communication interface 14 (step S204). Mobile station MS receiving the HTTP response stores the contents in a memory (step S205), and reproduces them with a command from a user (step S206).

On the other hand, if the receiving date is not within the distribution periods, the contents are not allowed to be distributed. Accordingly, CPU 11 sends an error message to mobile station MS, and terminates its operation.

As described above, content server CS according to the present embodiment, if a user of mobile station MS is located in a country where the usage of content is not permitted, detains the content temporarily, and after confirming that the user has moved to a country where the usage of the content is permitted, sends the detained content to mobile station MS of the user. Accordingly, a user of mobile station MS is allowed to receive content as long as the user is located in an area where the distribution of the content is permitted.

Also, as described above, content server CS checks whether an expected return date of a user is within a distribution period of the content before detaining content, and if so, detains the content. Namely, content server CS detains only content that is later distributable to a user. Accordingly, content server CS does not detain unnecessary content.

[C. Modifications]

The above embodiment may be modified as described below.

In the above embodiment, where content server CS checks whether a roaming identifier contained in a received HTTP request to determine whether the HTTP request is from mobile station MS located in a foreign network or mobile station MS located in a home network, content server CS may also check a country code contained in the HTTP request. By doing so, content server CS is able to know a location of mobile station MS more exactly.

In the above embodiment, where gateway GW converts a carrier code into a country code which is understandable for content server CS, gateway GW may convert a carrier code into a carrier identifier which is understandable for content server CS. With the configuration, content server CS is able to know a carrier managing a network in which mobile station MS is located.

In the above embodiment, if content server CS is able to understand a carrier code and a roaming flag, gateway server GW does not have to convert them as described above.

In the above embodiment, where gateway GW determines whether an HTTP request is from a mobile station located in a foreign network or from mobile station MS located in a home network on the basis of the presence or absence of a roaming flag, mobile station MS may be provided with a GPS (Global Positioning System), and gateway GW may make the above determination on the basis of a location which is identified by the GPS and added in an HTTP request.

Alternatively, gateway GW may refer to registration information of a home location register, and on the basis of the registration information, determine whether an HTTP request is from a mobile station located in a foreign network or from mobile station MS located in a home network. In this case, a home location register stores, in addition to storing an area ID of a location registration area in which mobile station MS is located and a telephone number of mobile station MS in association with each other, which information indicates whether mobile station MS is located in a foreign country. Registration of the information in a home location register may be applied manually by a user of mobile station MS.

Registration information of a home location register may be referred to by gateway GW or gateway switching station GMMS in mobile communication network IMT. Gateway GW or gateway switching station GMMS refers to registration information of a home location register when receiving an HTTP request from mobile station MS, and determines whether the HTTP request is from within a foreign network or from within a home network. If determining that the HTTP request is from a foreign network, Gateway GW or gateway switching station GMMS adds a roaming identifier to the HTTP request and sends it to content server CS.

In the above embodiment, where a country is treated as one unit in the country code, an area consisting of plural countries (e.g. the European Union) or an area of a country may be treated as one unit in view of religious or political circumstances. Also, a country which is not recognized internationally may be treated as one unit. In essence, an area which can be designated as a licensed territory, no matter whether the area is a country, state, or district, may be treated as one unit.

In the above embodiment, where content server CS does not send content to mobile station MS if the content is not allowed to be distributed abroad and mobile station MS is located in a foreign network, content server CS may send content to mobile station MS on condition of additional charges.

Specifically, if CPU 11 of content server CS determines that the server is being accessed by mobile station MS located in a foreign network, it sends a message to mobile station MS to inquire of a user of the mobile station whether s/he will pay additional charges for accessing the content. If the user of mobile station MS agrees to pay the additional charges, CPU 11 of content server CS sends the content to mobile station MS. The additional charges may include copyright fees for the content, and may vary from area to area.

In the above embodiment, where content server CS sends content to mobile station MS unconditionally if the content is allowed to be distributed abroad, content server CS may notify distribution charges of the content to mobile station MS before sending the content. This is because some users prefer the content to be detained and to receive it in Japan to avoid high distribution charges associated with an international roaming service. Content server CS, if requested by mobile station MS to detain the content, detains it, and if requested to send the content, sends it to mobile station MS.

In the above embodiment, where a roaming flag is added in a foreign network to an HTTP request sent from mobile station MS located in the network, a roaming flag may be added in a home network.

In the above embodiment, an entity distributing content to mobile station MS may not be a single device such as content server CS, but a system consisting of plural devices.

In the above embodiment, where content is protected by copyright, the content may be content not protected by copyright. In essence, the present invention is applicable to content as long as distribution of the content is restricted by geographical conditions.

In the above embodiment, where mobile station MS is an IMT-2000 mobile phone, mobile station MS may be a PDC (Personal Digital Cellular) mobile phone or a PHS (Personal Handyphone System).

In the above embodiment, where an HTTP is used as a protocol for communicating between mobile station MS and content server CS, any other protocol may be used.

The program executed by CPU 21 of gateway GW or CPU 11 of content server CS can be distributed via a computer-readable recording medium such as a magnetic recording medium, an optical recording medium, or a ROM. Also, the program can be distributed via a network such as the Internet to gateway GW or content servers CS1 to CS4.

What is claimed is:

1. A method of distributing content data to a mobile station of a communication system adapted for distributing content data, the method comprising:
   receiving at a distribution device a first request for content data from the mobile station, the first request comprising a mobile station identifier of the mobile station;
   determining by the distribution device that the first request for the content data includes a roaming identifier, the roaming identifier indicating that the mobile station is outside of a home communications network;
   determining by the distribution device that the content data requested in the first request for content data is not allowed to be distributed outside the home communications network;
   receiving at the distribution device data indicating a future time when the mobile station will be at a location at which distribution to the mobile station of the content data requested with the first request is authorized;
   determining by the distribution device that the distribution of content data is authorized for download to the mobile station at the indicated future time; and
   storing by the distribution device the requested content data correlated to the mobile station identifier, the requested content data stored for download to the mobile station at the indicated future time in response to the determination that the distribution of content data is authorized for download to the mobile station at the indicated future time.

2. The method of claim 1, further comprising, determining by the distribution device that the first request for the content data does not include the roaming identifier, the distribution device transmitting to the mobile station a query inquiring whether to download the content data to the mobile station, and
   the distribution device receiving authorization from the mobile station to download the content data in response to the query, and the distribution device transmitting the content data to the mobile station.

3. The method of claim 2, wherein the query comprises cost data associated with transmitting the content data.

4. The method of claim 1, further comprising the distribution device transmitting a query to the mobile station when it is determined that the request for the content data includes the roaming identifier, and the requested content data is not allowed to be distributed abroad.

5. The method of claim 4, wherein the query comprises a data request, the data request for the future time when the mobile station will be at the location at which distribution of the requested content data to the mobile station is authorized.

6. The method of claim 5, further comprising the distribution device sending a command to the mobile station for the mobile station to send a second request for the content data.

7. The method of claim 6, wherein the command to the mobile station for the mobile station to send the second request for the content data comprises a command for the mobile station to send the second request for the content data when the mobile station returns to the home communications network or the location at which the distribution of the requested content data to the mobile station is authorized.

8. The method of claim 1, further comprising:
   determining by the distribution device whether the content data are subject to a distribution limitation; and
   transmitting by the distribution device the content data to the mobile station if it is determined by the distribution device that the content data are not subject to the distribution limitation.

9. The method of claim 8, further comprising:
   transmitting by the distribution device a query for receipt by the mobile station, the query requesting authorization to transmit the content data not subject to the distribution limitation; and
   transmitting the content data by the distribution device if it is determined that the content data are not subject to the distribution limitation and authorization to transmit the content data is received by the distribution device from the mobile station.

10. The method of claim 9, wherein the query requesting authorization to transmit the content data not subject to the distribution limitation includes cost data for transmitting the content data not subject to the distribution limitation to the mobile station.

11. A communication system adapted for distributing content data to at least one mobile station the communication system comprising:
   a distribution device configured to distribute content data to a mobile station, the distribution device further configured to receive a first request for the content data from the mobile station, the first request comprising a mobile station identifier of the mobile station;
   the distribution device further configured to determine that the first request for the content data includes a roaming identifier, the roaming identifier indicating that the mobile station is outside of a home communications network;
   the distribution device further configured to determine that the content data requested with the first content request is not allowed to be distributed outside the home communication network;
   the distribution device further configured to receive data indicating a future time when the mobile station will be at a location at which distribution to the mobile station of the content data requested with the first request is authorized;

the distribution device further configured to determine that the distribution of the content data is authorized for download to the mobile station at the indicated future time; and the distribution device further configured to store the requested content data correlated to the mobile station identifier for download to the mobile station at the indicated future time in response to determination by the distribution device that the distribution of content data is authorized for download to the mobile station at the indicated future time.

12. The communication system of claim 11, wherein the distribution device is further configured to transmit to the mobile station a query whether to download the content data to the mobile station, the query transmitted by the distribution device in response to determination by the distribution device that the request for the content data does not include the roaming identifier, and the distribution device further configured to transmit the requested content data to the mobile station in response to receipt by the distribution device of authorization from the mobile station to proceed with download of the content data.

13. The communication system of claim 12, wherein the query comprises cost data associated with transmission of the content data.

14. The communication system of claim 11, wherein the distribution device is further configured to transmit a query to the mobile station in response to determination by the distribution device that the first request for the content data includes the roaming identifier, and the requested content data is not allowed to be distributed abroad.

15. The communication system of claim 14, wherein the query comprises a request for the future time when the mobile station will be at the location at which distribution of the requested content data to the mobile station is authorized.

16. The communication system of claim 15, wherein the distribution device is further configured to send a command to the mobile station for the mobile station to send a second request for the content data.

17. The communication system of claim 16, wherein the command to the mobile station for the mobile station to send the second request for the content data comprises a command for the mobile station to send the second request for the content data when the mobile station returns to the home communications network.

18. The communication system of claim 11, wherein the distribution device is further configured to determine whether the content data are subject to a distribution limitation; and the distribution device further configured to transmit the content data to the mobile station, if it is determined that the content data are not subject to a distribution limitation.

19. The communication system of claim 18, wherein the distribution device is further configured to transmit a query for receipt by the mobile station, the query comprising an authorization request requesting authorization to transmit the content data not subject to a distribution limitation; and wherein the distribution device is further configured to transmit the content data in response to the content data not being subject to the distribution limitation, and in response to a transmittal authorization received from the mobile station authorizing transmittal of the content data to the mobile station.

20. The communication system of claim 19, wherein the query comprises the authorization request to transmit the content data not subject to the distribution limitation, and cost data to transmit the content data not subject to the distribution limitation.

21. A distribution device for distributing content data to at least one mobile station comprising:

a communication interface configured to receive a first request for content data from a mobile station, the first request comprising a mobile station identifier of the mobile station;

a processor in communication with the communication interface, the processor configured to determine that the first request for the content data includes a roaming identifier, the roaming identifier indicating that the mobile station is outside of a home communications network;

the processor further configured to determine that the content data is not allowed to be distributed outside the home communication network;

the processor further configured to receive data indicating a future time when the mobile station will be at a location at which distribution to the mobile station of the content data is authorized;

the distribution device further configured to determine that the distribution of the content data is authorized for download to the mobile station at the indicated future time; and the processor further configured to store the requested content data correlated to the mobile station identifier for download to the mobile station at the indicated future time in response to determination that distribution of content data is authorized for download to the mobile station at the indicated future time.

22. The distribution device of claim 21, wherein the processor is further configured to transmit a query to the mobile station whether to download the content data to the mobile station in response to determination by the processor that the first request for the content data does not include the roaming identifier; and wherein the processor is further configured to transmit the requested content data to the mobile station in response to receipt from the mobile station of authorization to download the content data to the mobile station.

23. The distribution device of claim 22 wherein the query to the mobile station comprises cost data associated with transmission of the content data to the mobile station.

24. The distribution device of claim 21, wherein the communication interface is further configured to transmit a query to the mobile station in response to determination by the processor that the first request for the content data includes the roaming identifier, and the requested content data is not allowed to be distributed abroad.

25. The distribution device of claim 24, wherein the query comprises a request for the future time when the mobile station will be at the location at which distribution of the requested content data to the mobile station is authorized.

26. The distribution device of claim 25, wherein the processor is further configured to send a command to the mobile station, the command sent to trigger the mobile station to send a second request for the content data to the distribution device.

27. The distribution device of claim 26, wherein the command to the mobile station to trigger the mobile station to send the second request for the content data comprises a command to trigger the mobile station to send the second request for the content data when the mobile station returns to the home communications network.

28. The distribution device of claim 21, wherein the processor is further configured to determine whether the content data are subject to a distribution limitation; and the communication interface further configured to transmit the content data to the mobile station in response to determination by the processor that the content data are not subject to the distribution limitation.

29. The distribution device of claim 28, wherein the communication interface is further configured to transmit a query for receipt by the mobile station, the query requesting authorization to transmit the content data not subject to the distribution limitation; and wherein the content data are transmitted in response to determination by the processor that the content data are not subject to the distribution limitation, and receipt by the processor of an authorization from the mobile station to transmit the content data to the mobile station.

30. The communication system of claim 29, wherein the query requesting authorization to transmit the content data that is not subject to the distribution limitation includes cost data indicative of a cost to transmit the content data not subject to the distribution limitation to the mobile station.

31. A method of distributing content data to a mobile station of a communication system adapted for distributing content data, the method comprising:

receiving at a distribution device a first request for content data from the mobile station, the first request comprising a mobile station identifier of the mobile station;

determining by the distribution device that a roaming identifier is present with the first request, said roaming identifier indicating that the mobile station is outside of a home network;

in response to the roaming identifier being present, transmitting by the distribution device a query to the mobile station inquiring whether transmission of the requested content data is authorized while the mobile station is outside of the home network;

receiving at the distribution device a response from the mobile terminal indicating that transmission of the content data requested in the first request for content data is not allowed to be distributed outside the home network;

receiving at the distribution device data indicating a future time when the mobile station will be at a location at which distribution to the mobile station of the content data requested with the first request is authorized;

determining by the distribution device that the distribution of content data is authorized for download to the mobile station at the indicated future time; and storing by the distribution device the requested content data correlated to the mobile station identifier, the requested content data stored for download to the mobile station at the indicated future time in response to the determination that the distribution of content data is authorized for download to the mobile station at the indicated future time.

32. The method of claim 31, wherein the query further comprises a data request for the future time when the mobile station will be in the home network.

33. The method of claim 31, further comprising sending a command to the mobile station for the mobile station to send a second request for the content data at the future time.

34. A communication system adapted for distributing content data comprising at least one mobile station the communication system comprising:

a distribution device for distributing content data to a mobile station;

the distribution device configured to receive a first request for content data transmitted from the mobile station, the first request comprising a mobile communication identifier of the mobile station;

the distribution device further configured to receive authorization to transmit the requested content data in response to a query transmitted from the distribution device;

the distribution device further configured to determine that a roaming identifier is present in the first request, said roaming identifier indicating that the mobile station is outside of a home network;

the distribution device further configured to transmit a query to the mobile station, in response to the roaming identifier being present in the first request, the query being an inquiry into whether transmission of the requested content data is authorized while the mobile station is outside of the home network;

the distribution device further configured to receive a response from the mobile terminal indicating that transmission of the content data requested in the first request for content data is not allowed to be distributed outside the home network;

the distribution device further configured to receive data indicating a future time when the mobile station will be at a location at which distribution to the mobile station of the content data requested with the first request is authorized;

the distribution device further configured to determine that the distribution of content data is authorized for download to the mobile station at the indicated future time; and the distribution device further configured to store the requested content data correlated to the mobile station identifier for download to the mobile station at the indicated future time in response to the determination that the distribution of content data is authorized for download to the mobile station at the indicated future time.

35. The communication system of claim 34, wherein the query comprises a data request for the future time when the mobile station will be in the home network.

36. The communication system of claim 34, wherein the distribution device is further configured to send a command to the mobile station instructing the mobile station to send a second request for the content data at the future time.

37. A distribution device for distributing content data comprising at least one mobile station, the distribution device comprising:

a communication interface configured to receive a first request for content data from a mobile station, the first request comprising a mobile station identifier of the mobile station;

a processor configured to determine with respect to the first request that a roaming identifier is present, said roaming identifier indicating that the mobile station is outside of a home network;

the processor further configured to transmit a query to the mobile station, in response to the roaming identifier being present in the first request, the query being an inquiry into whether transmission of the requested content data is authorized while the mobile station is outside of the home network;

the processor further configured to receive a response from the mobile terminal indicating that transmission of the content data requested in the first request for content data is not allowed to be distributed outside the home network;

the processor further configured to receive data indicating a future time when the mobile station will be at a location at which distribution to the mobile station of the content data requested with the first request is authorized;

the processor further configured to determine that the distribution of content data is authorized for download to the mobile station at the indicated future time; and the processor further configured to store the requested content data correlated to the mobile station identifier for download to the mobile station at the indicated future time in response to the determination that the distribution of content data is authorized for download to the mobile station at the indicated future time.

38. The distribution device of claim 37, wherein the query further requests the future time when the mobile station will be in the home network.

39. The distribution device of claim 37, further comprising the processor further configured to send a command to the mobile station to trigger the mobile station to send a second request for the content data at the future time.

40. The method of claim 1 further comprising:
receiving at the distribution device a second request for the content data from the mobile station;
determining by the distribution device that the second request for the content data does not include the roaming identifier; and
based on the determination that the second request for the content data does not include the roaming identifier, transmitting by the distribution device the stored content data to the mobile station.

41. The communication system of claim 11, wherein
the distribution device is further configured to receive a second request for the content data from the mobile station;
the distribution device is further configured to determine that the second request for the content data does not include the roaming identifier; and
the distribution device is further configured to transmit the stored content data to the mobile station in response to determination by the distribution device that the second request for the content data does not include the roaming identifier.

42. The distribution device of claim 21, wherein
the communication interface is further configured to receive a second request for the content data from the mobile station;
the processor is further configured to determine that the second request for the content data does not include the roaming identifier; and
the processor is further configured to transmit the stored content to the mobile station in response to determination by the processor that the second request for the content data does not include the roaming identifier.

43. The method of claim 31, further comprising:
receiving at the distribution device a second request for the content data from the mobile station;
determining by the distribution device that the roaming identifier is not present with the second request; and
in response to the roaming identifier not being present with the second request, transmitting by the distribution device the stored content data to the mobile station.

44. The communication system of claim 34, wherein
the distribution device is further configured to receive a second request for content data from the mobile station;
the distribution device is further configured to determine with respect to the second request that a roaming identifier is not present; and
the distribution device is further configured to transmit the stored content data to the mobile station in the absence of the roaming identifier in the second request.

45. The distribution devices of claim 37, wherein
the communication interface is further configured to receive a second request for content data from the mobile station;
the processor is further configured to determine with respect to the second request that a roaming identifier is not present; and
the processor is further configured to transmit the stored content data to the mobile station in response to the roaming identifier not being present.

* * * * *